Aug. 20, 1968      K. SALNA      3,397,752

ARTICULATED FRAME STEER TRACTOR

Original Filed Dec. 23, 1964      2 Sheets-Sheet 1

INVENTOR.
Karl Salna
BY Julian Schechner
Atty.

Aug. 20, 1968 K. SALNA 3,397,752
ARTICULATED FRAME STEER TRACTOR
Original Filed Dec. 23, 1964 2 Sheets-Sheet 2
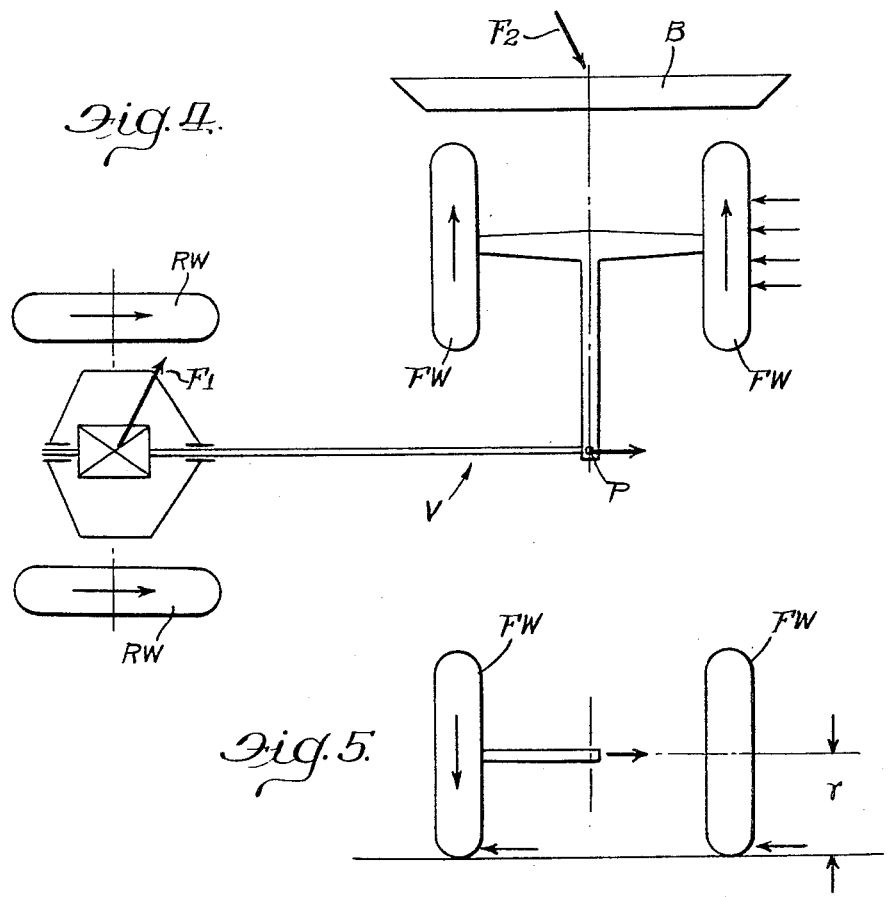
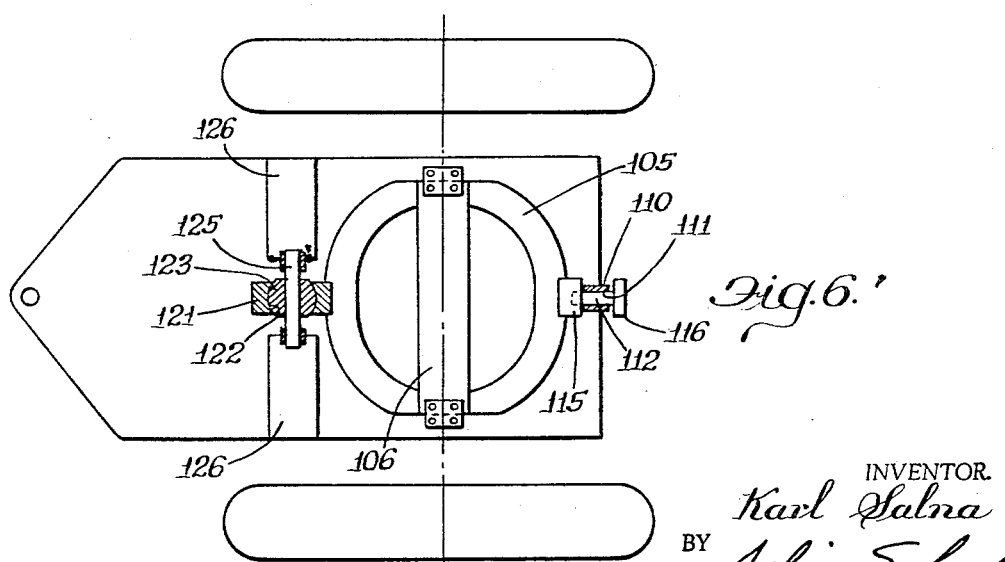
INVENTOR.
Karl Salna
BY Julius Schachner
Atty.

United States Patent Office 3,397,752
Patented Aug. 20, 1968

3,397,752
ARTICULATED FRAME STEER TRACTOR
Karl Salna, Mundelein, Ill., assignor to International Harvester Company, a corporation of Delaware
Continuation of application Ser. No. 420,683, Dec. 23, 1964. This application July 15, 1966, Ser. No. 565,655
1 Claim. (Cl. 180—51)

This invention relates in general to vehicles, and more particularly to articulated vehicles of the frame-steer type.

It is a well-known expedient to articulate front and rear sections of a vehicle and steer the vehicle by mechanically varying the angular relationship between the sections. The concept is widely utilized in heavy construction vehicles and, more specifically, in vehicles designed for earth moving and highway construction.

A large articulated rubber tire bulldozer, for example, usually includes a front section supported for travel on a wheel truck and mounting a bulldozer blade. The front section is connected for pivotal movement about a generally vertical axis to a rear section which is also supported on a wheel truck. Hydraulic motor means interconnect the sections and effect angular movement between them to induce steering under the control of an operator. Such "articulated" steering is especially advantageous in construction vehicles because of the great versatility of maneuverability it affords.

With heavy earth moving equipment particularly, however, the effects of articulation are not all meritorious. As the angular relationship between vehicle sections becomes more acute, for example, greater side loading is thrown onto the front wheels by the driving effect of the rear wheels. This side loading has a tendency to lift the inside front wheel slightly off the terrain and, consequently, tire-slippage occurs. In a four-wheel drive vehicle, such tire slippage results in unequal and, consequently, damaging load factors and loss in performance being effective on the vehicle.

It is an object of the present invention to provide an improved articulated vehicle construction.

It is another object to provide an improved articulated vehicle construction which automatically compensates for side-loading on the front wheels of the vehicle as it works in articulated relationship.

It is still another object to provide an improved articulated vehicle construction wherein a predetermined amount of side-loading compensation is built into the vehicle, depending upon the average load factor anticipated.

It is yet another object to provide an articulated material handling vehicle such as a bulldozer or the like wherein tire slippage due to side loading during working in articulated relationship is substantially eliminated.

It is a further object to provide an articulated vehicle construction which has a built-in self-straightening effect for road travel and the like.

It is still a further object to provide an articulated vehicle having a new and improved wheel truck mounting.

It is yet a further object to provide an articulated vehicle including a pivot mounting arrangement for the rear wheel truck means incorporating a bearing arrangement which minimizes bearing wear.

The foregoing and other objects are realized in accord with the present invention by providing a canted axis articulated vehicle. The normally vertical pivot axis between vehicle sections is inclined rearwardly a predetermined number of degrees. Accordingly, when the vehicle articulates to turn, the front section tilts slightly about its longitudinal axis toward the inside of the turn. The amount of inward tilt is pre-calculated to compensate for outward tilt of the front section induced by the couple defined between the driving force of the rear wheels acting along the longitudinal axis of the rear vehicle section and the reactive force of the terrain acting on the front wheels at ground level. Accordingly, front wheel slippage is substantially avoided.

A further aspect of the invention resides in the relationship between the rear vehicle section and its supporting wheel truck. The rear vehicle section is mounted on its wheel truck for pivotal movement relative thereto about the longitudinal axis of the section, whereby the rear wheel truck is able to closely follow the often rough terrain. The pivotal mounting arrangement for the truck includes a universal joint arrangement which substantially eliminates thrust bearing play in the truck mounting.

The invention, both as to its organization and method of operation, taken with further objects and advantages thereof, will best be understood by reference to the following description taken in connection with the accompanying drawings, in which:

FIGURE 4 is a diagrammatic plan view of a conventional articulated bulldozer subjected to normal loading while working in articulated relationship;

FIGURE 5 is a sectional view taken along line 5—5 of FIGURE 4; and

FIGURE 6 is a bottom plan view of the rear vehicle section in the articulated vehicle illustrated in FIGURE 1.

Figure 1:
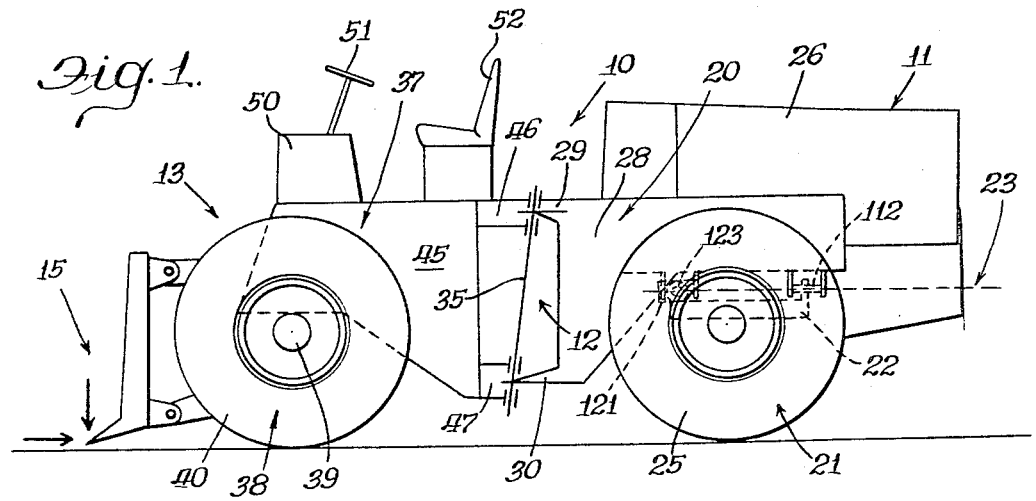
FIGURE 1 is a side elevational view of an articulated bulldozer embodying features of the present invention.

Referring now to the drawings, and particularly to FIGURE 1, an articulated four-wheel drive material handling vehicle embodying features of the present invention is illustrated generally at 10. The vehicle 10 includes a rear vehicle section 11 connected for articulated movement about an axis 12 to a front vehicle section 13. A conventional bulldozer blade assembly 15 is mounted on the front vehicle section 13.

According to the present invention the axis 12 of articulation is inclined rearwardly. The rearward inclination of the axis 12 causes the front vehicle section 13 to tend to lean slightly toward the inside of a turn as the vehicle 10 works in articulated relationship. The extent to which the front section 13 leans toward the inside of a turn as the vehicle 10 works in articulated relationship is determined by the angle of rearward inclination of the axis 12 and is designed to be sufficient to precisely balance any tendency of the front vehicle section 13 to tilt toward the outside of the turn under the influence of side loading on the front vehicle section. The front vehicle section loses traction if it tilts toward the outside while working in a turn, of course. In a four-wheel vehicle 10 such loss of traction on one side results in unequal loading on the vehicle and other detrimental side effects.

The forces which are effectively balanced by the rearward inclination of the axis 12 in the vehicle 10 according to the present invention are illustrated in FIGURES 4 and 5. FIGURE 4, for example, diagrammatically illustrates a conventional articulated vehicle in plan view at V. In the working relationship illustrated, the vehicle V is articulated at 90° about its conventional vertical pivot P as the bulldozer blade B engages a load.

Working in this articulated relationship, the rear-driving wheels RW of the vehicle V exert a force indicated by the arrow at the pivot P along an axis perpendicular to the planes of the front driving wheel FW. The effect of this force acting perpendicularly to the front driving wheel FW in a conventional articulated bulldozer is to introduce a tipping moment in the front wheels FW equal to the force exerted by the driving rear wheels RW times the radius $r$ of the front wheels FW, as illustrated in FIGURE 5. The reactive force of the front wheels FW gripping the terrain creates a couple which tends to tilt the front section of the vehicle V.

If the inner of the front wheels FW lifts off the ground, slippage occurs and unequal loading is effected on the vehicle V, of course. Where the front wheels FW are driving wheels, lifting of an inside front wheel FW slightly off the ground causes the blade B to tilt which cuts a hole and the operator could not hold a grade or level cut.

According to the present invention, the tendency of the inside front wheel FW on the vehicle V illustrated in FIGURES 4 and 5 to lift off the terrain is counteracted by canting the pivot axis P of the vehicle rearwardly. The angular inclination of the axis P is determined by the load factors or range of load factors with which the bulldozer V will work. The load factors to be considered include the horsepower rating of the vehicle and the load capacity of the blade B, and especially if the blade B is replaced with front end loader where the load is carried high and the dynamic stability is of most importance. With the vehicle working in articulated relationship, a force component $F_1$ exerted by the rear wheels RW is directed toward the blade B. Correspondingly, the reactive force component $F_2$ of the load acting on the front wheels FW is canted at an angle to the bulldozer blade B in the direction of travel of the rear wheels RW. Thus, it will be seen that greater force components $F_1$ beget greater reactive force components $F_2$ and a greater tendency of the front wheels FW to tilt outwardly is effected.

Turning now to the details of construction of the vehicle 10 constructed according to the present invention, and referring again to FIGURES 1-3, the rear vehicle section 11 includes a chassis 20 supported on a wheel truck 21 by a pivotal mounting arrangement 22 for relative pivotal movement about its longitudinal axis 23. The pivotal mounting arrangement 22 permits the wheels 25 of the truck 21 to remain in contact with the ground over very uneven terrain. Furthermore, the pivotal mounting arrangement 22 obviates the normal detrimental effects of longitudinal shock loading in the pivotal connection between the truck 21 and the chassis 20.

The chassis 20 of the rear vehicle section 11 includes a conventional power plant 26 mounted on a generally Y-shaped frame 28. The frame 28 includes forwardly extending arms 29 and 30 which cooperate with a pivot shaft 35 to pivotally interconnect the vehicle sections 11 and 13 according to the present invention. The shaft 35 defines the axis 12 of articulation, of course.

The front vehicle section 13 comprises a chassis 37 mounted on a front wheel truck 38. The transversely extending axle 39 of the front wheel truck 38, which mounts front wheels 40, is fixed to the chassis 37 so that the two chassis 37 and 20 of the vehicle sections 13 and 11, respectively, remain upright during normal, straight ahead travel.

The chassis 37 includes a frame 45 having rearwardly extending arms 46 and 47 which cooperate with the shaft 35 to interconnect the vehicle sections 11 and 13 in articulated relationship. A control console 50 including a steering wheel 51 is mounted on the frame 45 in front of an operator's seat 52.

The front vehicle section 13 and the rear vehicle section 11 are conventionally interconnected by hydraulic motor means (not shown) to effect articulation between the vehicle sections. Control of these motor means is maintained by the operator riding on the front vehicle section 13, through the steering wheel 51 suitably connected by a hydraulic system (not shown) to the aforementioned hydraulic motor means. Since such a hydraulic system, including the motor means, for articulating vehicles of this type is conventional and, further, forms no specific part of the present invention, a more detailed description is considered unnecessary.

The power plant 26 drives the rear wheels 25 of the vehicle 10 through a suitable drive connection (not shown) in a well-known manner. In addition, since the vehicle 10 is a four-wheel drive vehicle, a suitable drive connection (not shown) is also conventionally provided between the power plant 26 and the front wheels 40.

As the angular relationship between the front and rear sections 11 and 13 of the vehicle 10 is varied to effect turning of the vehicle in a well-known manner, the rearwardly inclined axis 12 of articulation has a tendency to cause the front section 13 to tilt toward the inside of the turn. The degree to which the section 13 tends to tilt inwardly is directly dependent upon the angle of rearward inclination of the shaft 35, as has been pointed out. Furthermore, the greater the angle of articulation developed between the front vehicle section 13 and the rear vehicle section 11, the greater the angle at which the front section 13 tends to tilt inwardly of the turn, up to a possible maximum inclination equal to the degree of rearward inclination of the axis 12. In the present instance, a 10° rearward inclination of the axis 12 has been found suitable for most working conditions.

Figure 2:
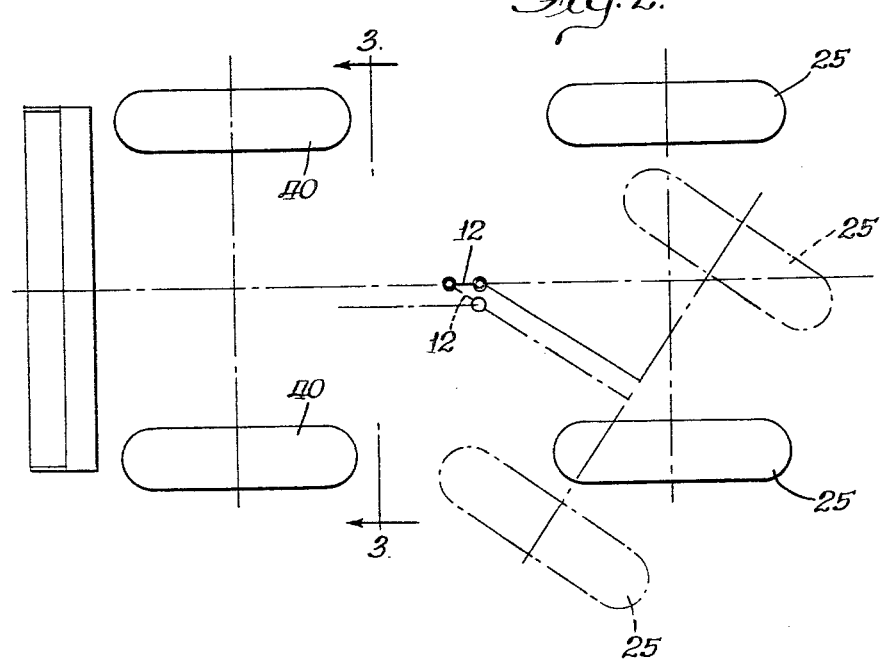
FIGURE 2 is a diagrammatic plan view of the wheel arrangement of the vehicle illustrated in FIGURE 1, during straight and articulated travel.
Figure 3:
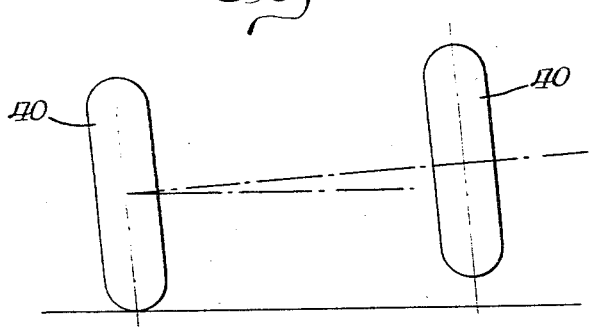
FIGURE 3 is a sectional view taken along line 3—3 of FIGURE 2, with the vehicle in articulated travel.

Referring to FIGURES 2 and 3, the vehicle 10 embodying features of the present invention is shown diagrammtically in about a 30–40° turn. With this axis 12 tilted rearwardly at 10°, the inward tilt of the wheel truck 38 (since the truck 38 and chassis 37 are rigidly fixed to each other) tends to be about 3°. However, side-loading on the front wheels 40 from the outside of the turn tends to tilt the wheel truck 38 in the opposite direction and the result, according to the present invention, is a balance of forces which leaves the truck 38 in a horizontal relationship. Accordingly, minimal slippage of the wheels 40 during operation is effected.

In addition to the foregoing, the rearward inclination of the axis 12 contributes another advantage. When the vehicle 10 is traveling in a straight line on a highway, for example, at relatively high speeds, any influence tending to cause the vehicle to articulate and turn is automatically counteracted by the imposed compression of the inside tire and a straightening effect is, accordingly, introduced.

Yet another feature of the present invention is embodied in the mounting arrangement 22 which pivotally mounts the chassis 20 on the rear wheel truck 21 of the rear vehicle section 11, as has been pointed out. The mounting arrangement 22 embodying features of the present invention is constructed and arranged to virtually eliminate thrust bearing wear normally encountered with conventional bearing arrangments utilized to provide such pivotal truck mounting.

Referring to FIGURES 1 and 6, the mounting arrangement 22 comprises a ring 105 which carries the axle 106 affixed thereto. An upwardly extending ear 110 is mounted on the rearmost portion of the ring 105 by welding or the like and has a bearing passage 111 formed therethrough transversely of the axle 106. A pin 112 mounted between brackets 115 and 116 depending from the chassis 20 of the rear vehicle section 11 extends through the bearing passage 111 and mounts the rear end of the ring 105 on the chassis for pivotal movement about the axis 23.

According to the present invention, the mounting arrangement 22 further includes a block 121 mounted on the ring 105 at its forwardmost portion by welding or the like. The block 121 has a segmentally spherical aperture 122 formed therein which seats a universal ball joint 123 mounted on a pin 125. The transversely extending pin 125 is, in turn, supported at its opposite ends in brackets 126 secured to the bottom of the chassis 20. The front end of the ring 105 is thus universally suspended from the chassis 20.

The mounting arrangement 22 permits pivotal movement of the chassis 20 about the axis 23 on the rear wheel truck 21 and, in addition, obviates axial play between chassis 20 and truck 21 normally encountered when two pin pivot mountings define the axis 22. Accordingly, the forward and rearward thrust forces developed by the driving wheels 25 cannot cause damage through bearing play.

While the embodiment described herein is at present considered to be preferred, it is understood that various modifications and improvements may be made therein, and it is intended to cover in the appended claim all such modifications and improvements as fall within the true spirit and scope of the invention.

What is desired to be claimed and secured by Letters Patent of the United States is:

1. In a four-wheel-drive, articulated vehicle including a front frame section supporting a control console including a steering wheel and an operator's seat rearwardly of said control console and a rear frame section supporting a power plant; a rear wheel truck including a pair of laterally spaced, ground-engaging wheels mounted for rotation about a single transversely extending axis, said rear wheel truck being connected to said rear frame section for relative rocking movement about an axis extending longitudinally of said rear frame section; a front wheel truck including a pair of laterally spaced, ground-engaging wheels mounted for rotation about a single transversely extending axis, said front wheel truck being substantially rigidly connected to said front frame section; and means for pivotally connecting said front and rear frame sections together for relative movement about an axis of articulation, said axis of articulation intersecting the longitudinal median line of said rear frame section and extending vertically upwardly and horizontally rearwardly from the point of intersection of said articulation axis and said rear frame section longitudinal median line.

References Cited

UNITED STATES PATENTS 3,191,709   6/1965   Symons.

A. HARRY LEVY, *Primary Examiner.*